(12) United States Patent
Yu

(10) Patent No.: US 6,972,750 B2
(45) Date of Patent: Dec. 6, 2005

(54) LIQUID CRYSTAL PANEL DEVICE HAVING A TOUCH PANEL AND METHOD OF FABRICATING THE SAME

(75) Inventor: Hwan Seong Yu, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 278 days.

(21) Appl. No.: 10/328,042

(22) Filed: Dec. 26, 2002

(65) Prior Publication Data

US 2003/0122801 A1  Jul. 3, 2003

(30) Foreign Application Priority Data

Dec. 27, 2001 (KR) ............... P2001-86112

(51) Int. Cl.⁷ ............................... G09G 5/00
(52) U.S. Cl. ................. 345/173; 178/18.01
(58) Field of Search ............. 345/173–178; 178/18; 428/41.8, 202

(56) References Cited

U.S. PATENT DOCUMENTS

| 4,589,590 A | * | 5/1986 | McGuire et al. ............ 229/92.8 |
| 5,869,790 A | * | 2/1999 | Shigetaka et al. ........ 178/18.03 |
| 6,456,279 B1 | * | 9/2002 | Kubo et al. ................. 345/173 |
| 6,690,361 B1 | * | 2/2004 | Kang et al. ................. 345/173 |

FOREIGN PATENT DOCUMENTS

JP  2001201741 A * 7/2001 ......... G02F 1/1335

* cited by examiner

Primary Examiner—Alexander Eisen
Assistant Examiner—Robin Mak
(74) Attorney, Agent, or Firm—McKenna Long & Aldridge LLP

(57) ABSTRACT

A touch panel integrated liquid crystal display panel, includes a liquid crystal display panel displaying a picture by driving liquid crystal, a polarizer formed at the top of the liquid crystal display panel, and a touch panel with a separation tag extending outwards from at least one side of the top of the polarizer.

20 Claims, 4 Drawing Sheets

LIQUID CRYSTAL PANEL DEVICE HAVING A TOUCH PANEL AND METHOD OF FABRICATING THE SAME

The present invention claims the benefit of Korean Patent Application No. P2001-86112 filed in Korea on Dec. 27, 2001, which is hereby incorporated by reference.

BACKGROUND OF THE INVENTION

1. Field of the Invention

The present invention relates to a liquid crystal display panel having a touch panel, and more particularly to a liquid crystal display panel having a touch panel capable of preventing a polarizer from being damaged upon a repairing process.

2. Description of the Related Art

The touch panel is a computer peripheral that is installed on the display surface of an image display device such as cathode ray tube (CRT), liquid crystal display (LCD), field emission display (FED), plasma display panel (PDP) and electro luminescence device (ELD) so that while looking at the image display device, a user applies pressure on the touch panel to enter a predetermined information into the computer.

Explained below is a liquid crystal display panel having a touch panel in a liquid crystal display device.

FIG. 1 is a view showing a liquid crystal display panel on which a touch panel is mounted according to the related art.

In FIG. 1, the liquid crystal display device has a touch panel 32, a liquid crystal panel 31, and a backlight 33 that are all independent. The touch panel 32 is connected to a touch controller 34 by signal lines 36, and the touch controller 34 is electrically connected to a computer system 35. Accordingly, if the top of the touch panel 32 is touched with a specific pressure, a voltage value of the position is calculated at the touch controller 34 to recognize its coordinates.

FIG. 2 is a plane view showing the liquid crystal display panel, on which the touch panel shown in FIG. 1 is mounted according to the related art. In FIG. 2, a touch panel 32 includes an upper plate 32a and a lower plate 32b, a liquid crystal display panel 31 includes an upper plate 31a and a lower plate 31b, and a polarizer 4 formed between the touch panel 32 and the liquid crystal display panel 31. The touch panel 32 includes an upper electrode formed on an upper substrate of the upper plate 32a, a lower electrode formed on a lower substrate of the lower plate 32b, and a spacer for maintaining a gap between the upper plate 32a and the lower plate 32b.

The liquid crystal display panel 31 includes an upper electrode (not shown) formed on an upper substrate of the upper plate 31a, a plurality of lower electrodes (not shown) formed on a lower substrate of the lower plate 31b, alignment films (not shown) formed on the upper and lower electrodes, a liquid crystal material formed between the alignment films, a spacer (not shown) for controlling a cell gap formed between the upper plate 31a and the lower plate 31b. In addition, a sealant (not shown) that bonds and fixes the upper plate 31a and the lower plate 31b is formed to prevent moisture and impurities from permeating from the outside to the inside of the liquid crystal display panel 31 at the edge of the upper plate 31a and the lower plate 31b.

The polarizer 4 is formed between the lower plate 32b of the touch panel 32 and the upper plate 31a of the liquid crystal display panel 31, and serves for converting visible light into polarized light on both of its sides with the liquid crystal display panel in the center.

A first adhesive 39a is formed between the lower plate 32b of the touch panel 32 and the polarizer 4, and a second adhesive 39b is formed between the upper plate 31a of the liquid crystal display panel 31 and the polarizer 4. The touch panel 32 is bonded with the liquid crystal display panel 31 by the first adhesive 39a and the second adhesive 39b having the polarizer 4 therebetween.

During repair process of the touch panel 32, a knife or a thin plate is inserted by force between the touch panel 32 and the liquid crystal display panel 31, and the touch panel 32 is lifted upwards to be separated from the liquid crystal display panel 31. In this case, the knife or the thin plate can damage the touch panel 32. Accordingly, a significant amount of time is required since the separation requires high precision of placement of the knife or thin plate.

SUMMARY OF THE INVENTION

Accordingly, the present invention is directed to a liquid crystal display panel having a touch panel and method of fabricating the same that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touch panel device integrated with a liquid crystal display panel device includes a liquid crystal display panel, a polarizer formed at a top surface of the liquid crystal display panel, and a touch panel formed on the polarizer, wherein the touch panel includes a separation tag extending outwards from at least one side of the polarizer.

In another aspect, a method of fabricating a touch panel integrated liquid crystal display panel, includes the steps of forming a liquid crystal display panel, forming a polarizer at a top surface of the liquid crystal display panel, and forming a touch panel with a separation tag extending outwards from at least one side of a top of the polarizer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will not be made in detail to the preferred embodiments of the present invention, examples of which are illustrated in the accompanying drawings.

Figure 1:
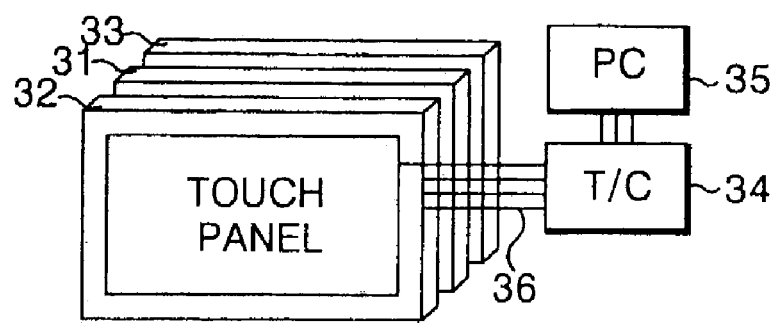
FIG. 1 is a view showing a liquid crystal display panel on which a touch panel is mounted according to the related art.
Figure 2:
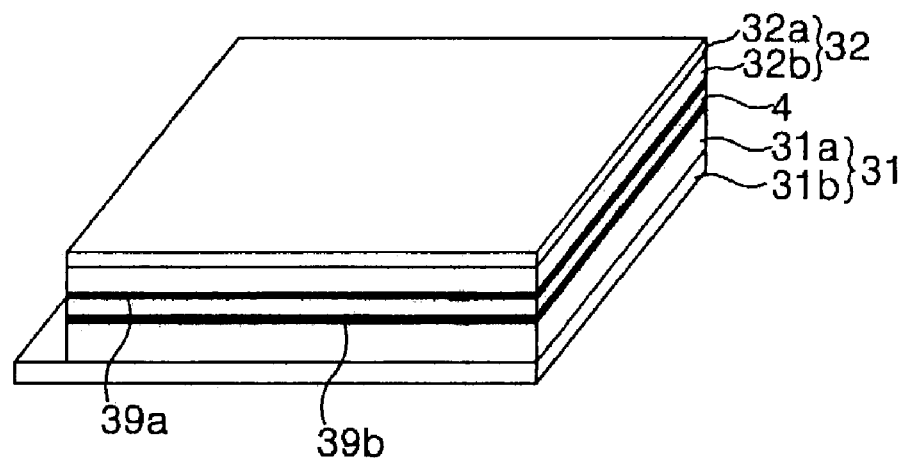
FIG. 2 is a plane view showing the liquid crystal display panel, on which the touch panel shown in FIG. 1 is mounted according to the related art.
Figure 3:
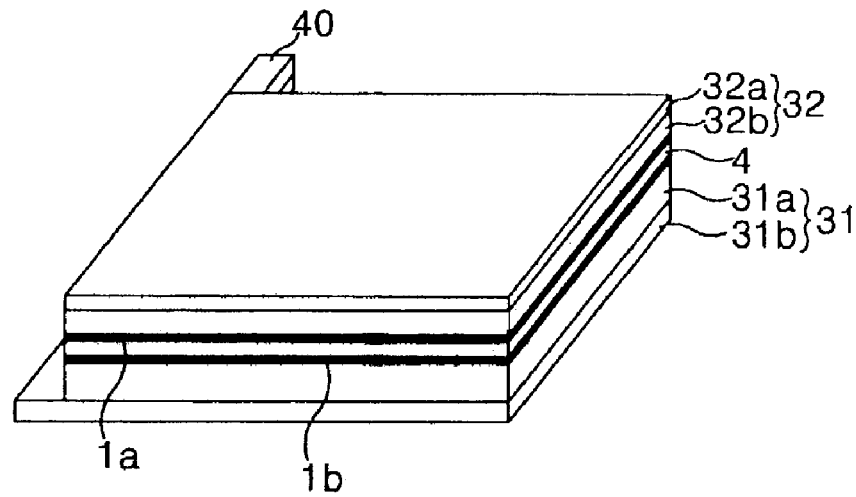
FIG. 3 is a plane view showing an exemplary liquid crystal display panel and touch panel according to the present invention.
Figure 4:
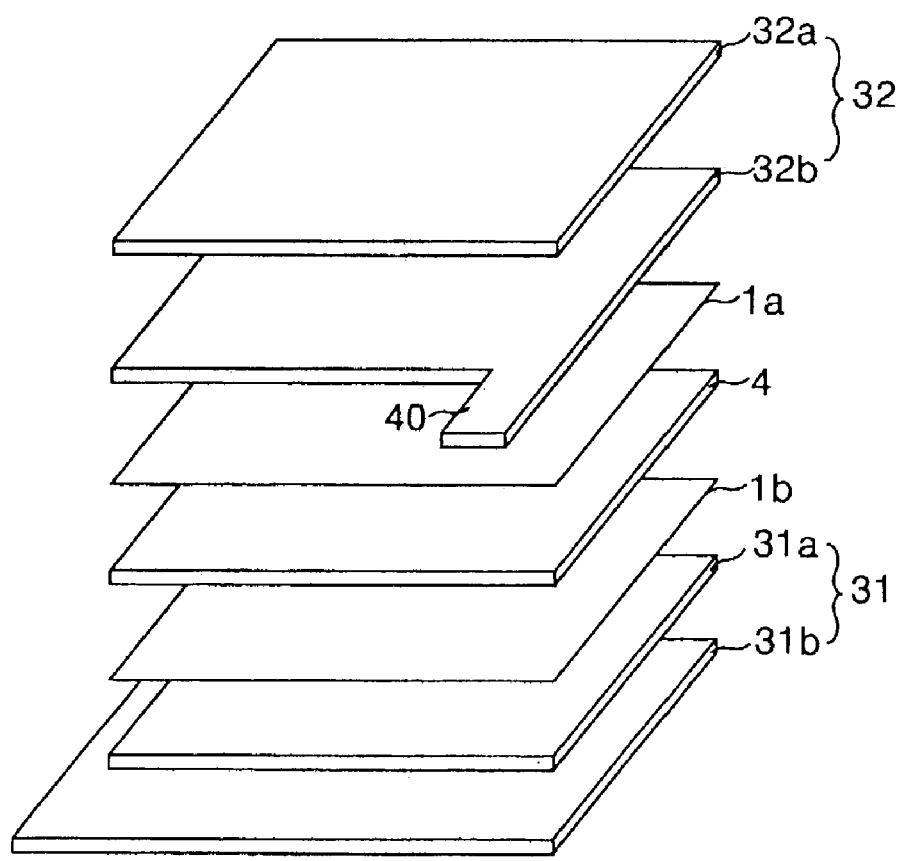
FIG. 4 is a perspective view showing the exemplary liquid crystal display panel and touch panel of FIG. 3 according to the present invention.

FIG. 3 is a plane view showing an exemplary liquid crystal display panel and touch panel according to the present invention, and FIG. 4 is a perspective view showing the exemplary liquid crystal display panel and touch panel of FIG. 3 according to the present invention. In FIGS. 3 and 4, the integrated liquid crystal display panel and touch panel may include a liquid crystal display panel 31 having an upper plate 31a and a lower plate 31b, a touch panel 32 having a separation tag 40 extending outwards from one side edge, and a polarizer 4 formed between the touch panel 32 and the liquid crystal display panel 31.

Figure 5:
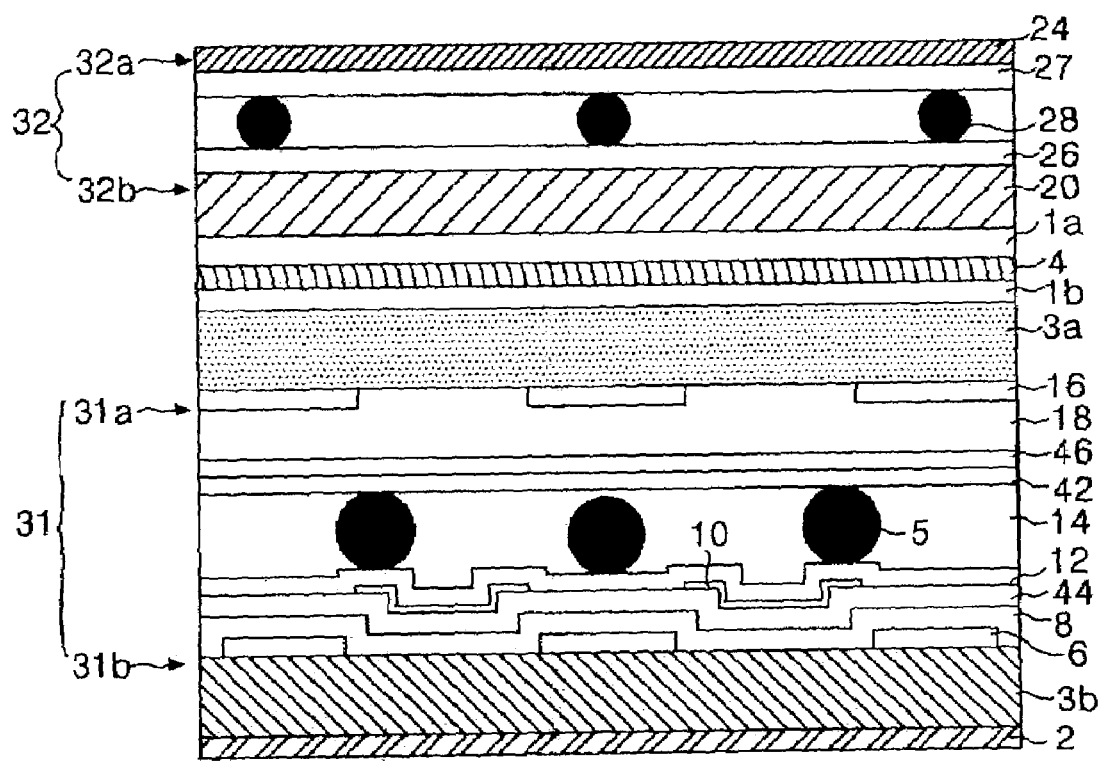
FIG. 5 is a cross-sectional view showing the exemplary liquid crystal display panel and touch panel of FIG. 4 according to the present invention.

FIG. 5 is a cross-sectional view of the exemplary liquid crystal display panel and touch panel of FIG. 4 according to the present invention. In FIG. 5 the liquid crystal display panel 31 may include a lower plate 31b, an upper plate 31a facing the lower plate 31b, and liquid crystal material 14 and a spacer 5 interposed between the upper plate 31a and the lower plate 31b. The lower plate 31b may include a thin film transistor formed at an intersection of a gate line 6 and a data line (not shown), and a pixel electrode 10 connected to a drain electrode (not shown) of the TFT.

The TFT may include a gate electrode (not shown) connected to the gate line 6, a source electrode (not shown) connected to the data line (not shown), and a drain electrode (not shown) connected to the pixel electrode 10. The TFT may further include a gate insulation film 8 for insulating the source electrode (not shown) from the drain electrode (not shown), and a semiconductor layer (not shown) for forming a conductive channel between the source electrode, and the drain electrode by means of gate voltage supplied to the gate electrode. In order to protect such a TFT, a protective film 44 may be formed, and the pixel electrode 10 may be formed on the protective film 44 to be connected to the drain electrode (not shown) via a contact hole fed-through (not shown) the protective film 44. A first alignment film 12 may be formed on the lower substrate 3b where the pixel electrode 10 is formed.

The upper plate 31a may include a black matrix 16, a color filter 18, a common electrode 46, and a second alignment film 42 sequentially formed on its lower surface. The black matrix 16 may be formed on the upper substrate 3a in a matrix shape to divide the surface of the upper substrate 3a into a plurality of cell areas where color filters 18 are to be formed, and to prevent light interference between adjacent cells.

Color filters 18 of red, green, and blue may be sequentially formed on the upper substrate 3a where the black matrix 16 may be formed. Accordingly, each color filter 18 may be formed by spreading a substance that absorbs white light and transmits a specific light (Red, Green, or Blue) on an entire surface of the upper substrate 3a where the black matrix 16 may be formed, and patterning it.

The common electrode 46 may be formed of a transparent conductive film whose ground potential is supplied to the upper substrate 3a where the black matrix 16 and the color filter 18 are formed. A second alignment film 42 may be formed on the upper substrate 3a where the common electrode 46 is formed.

The spacer 5 may be formed on the first alignment film 12 before the upper plate 31a is combined with the lower plate 31b. The upper plate 31a and the lower plate 31b may be separated from each other by a specific gap therebetween. For example, the spacer 5 may be provided to form a constant gap between the upper plate 31a and the lower plate 31b making the liquid crystal material 14 have uniform thickness.

The touch panel 32 may include a lower plate 32b having a first electrode layer 26 formed on the lower substrate 20 made of polyethylene terephthalate (PET), an upper plate 32a having a second electrode 27 formed on the upper substrate 24, and a spacer 28 formed between the upper plate 32a and the lower plate 32b.

A separation tag 40 (in FIG. 4) may be formed at one side edge of the lower substrate 20 and the upper substrate 24 to extend along an outward direction. Alternatively, the separation tag 40 may be formed only at one side edge of the lower substrate 20. The touch panel 32 may be separated from the polarizer 4 during a repair process by use of the separation tag 40. For example, an operator may lift the separation tag 40 formed at the touch panel 32 during the repair process to separate the touch panel 32 from the polarizer 4.

A first electrode layer 26 may be formed on a lower substrate 20 except at the separation tag 40 that extends from the lower substrate 20 of the lower plate 32b, and a second electrode layer 27 may be formed on an upper substrate 24 except at the separation tag 40 that extends from the upper substrate 24 of the upper plate 32a.

The second electrode layer 27 is electrically short-circuited with the first electrode layer 26 when the upper substrate 24 is pressed with a specific pressure by a stylus pen or a finger. Accordingly, a signal is generated having current and voltage level differences in accordance with the position being pressed. The first and the second electrode layers 26 and 27 may be formed of transparent conductive materials in a double layer structure including silver Ag printed on the transparent conductive material. The transparent conductive material may include of one of indium-tin-oxide (ITO), indium-zinc-oxide (IZO), indium-tin-zinc-oxide (ITZO).

The polarizer 4 may be formed between the lower plate 32b of the touch panel 32 and the upper plate 31a of the liquid crystal display panel 31, and may convert visible light into linear polarized light at both sides having the liquid crystal display panel therebetween.

A first adhesive 1a may be formed between the polarizer 4 and the lower plate 32b of the touch panel 32, and a second adhesive 1b may be formed between the polarizer 4 and the upper plate 31a. For example, the touch panel 32 and the liquid crystal display panel 31 formed with the polarizer 4 therebetween may be respectively bonded with the polarizer 4 by the first and the second adhesives 1a and 1b.

Figure 6:
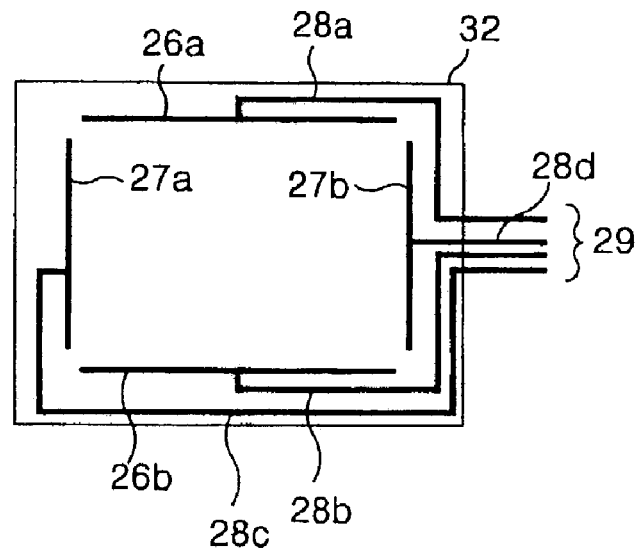
FIG. 6 is a diagram showing an exemplary electrode and signal line formed on the touch panel of FIG. 5 according to the present invention.
Figure 7:
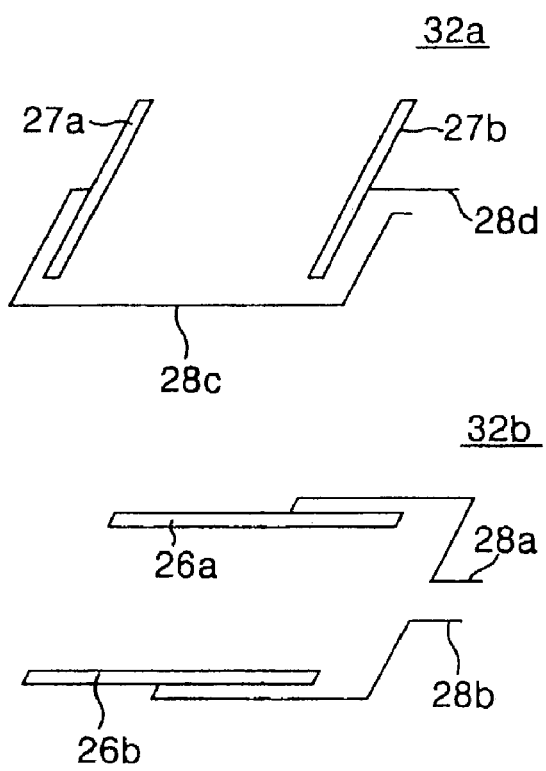
FIG. 7 is a diagram of exemplary electrodes and signal lines of FIG. 6 according to the present invention.

FIG. 6 is a diagram showing an exemplary electrode and signal line formed on the touch panel of FIG. 5 according to an embodiment of the present invention, and FIG. 7 is a diagram of exemplary electrode and signal lines of FIG. 6 according to an embodiment of the present invention. In FIGS. 6 and 7, the upper plate 32a of the touch panel 32 may include X-axis electrodes 27a and 27b formed along edges thereof in a vertical direction, and signal lines 28c and 28d extending from a center region of the X-axis electrodes 27a and 27b for supplying current or voltage level signals to the touch controller 34. The lower plate 32b of the touch panel 32 includes a Y-axis electrodes 26a and 26b formed along edges thereof in a horizontal direction, and signal lines 28a and 28b extending from a center portion of the Y-axis electrodes 26a and 26b for supplying current or voltage level signals to the touch controller 34. The signal lines 28a, 28b, 28c and 28d may include a tail part 29 and an electrode extension connected to the Y-axis and X-axis electrodes 26a, 26b, 27a and 27b. Accordingly, the touch panel 32 may include the signal lines 28a, 28b, 28c and 28d extending from the center portion of the Y-axis and X-axis electrodes 26a, 26b, 27a and 27b to one side of the touch panel 32 for making a connection to the touch controller 34.

The touch panel integrated liquid crystal display panel according to the present invention can also be applied to PDP's, FED's, and ELD's.

As described above, the touch panel integrated liquid crystal display panel according to the present invention has a separation tag extending at one side edge of the touch panel. The operator lifts this separation tag upwards to separate the touch panel from the polarizer in the touch panel repair process, thereby preventing the polarizer from being damaged. Also, since the touch panel is easily separated from the polarizer by the separation tag, the repair process is simple and the repair process is shortened in time.

It will be apparent to those skilled in the art that various modifications and variations can be made in the liquid crystal display panel having a touch panel and method of fabricating the same of the present invention without departing from the spirit or scope of the invention. Thus, it is intended that the present invention cover the modifications and variations of this invention provided they come within the scope of the appended claims and their equivalents.

What is claimed is:

1. A touch panel device integrated with a liquid crystal display panel device, comprising:
    a liquid crystal display panel;
    a polarizer formed at a top surface of the liquid crystal display panel; and
    a touch panel formed on the polarizer, the touch panel including a lower plate having, a separation tag extending outwardly from one side of the lower plate, such that when an upward force is applied on the separation tag, the touch panel separates from at least one side of the polarizer.

2. The touch panel device according to claim 1, wherein the touch panel includes:
    a first electrode layer on an upper substrate of a upper plate;
    a second electrode layer on the lower plate; and
    a spacer formed between the upper plate and the lower plate.

3. The touch panel device according to claim 2, wherein the separation tag and the lower substrate are integrally formed.

4. The touch panel device according to claim 3, wherein the separation tag includes polyethylene terephthalate.

5. The touch panel device according to claim 2, wherein the first and the second electrode layers are formed of a transparent electrode and silver formed on the transparent electrode.

6. The touch panel device according to claim 1, wherein the liquid crystal display panel includes:
    an upper plate bonded with the polarizer;
    a lower plate facing the upper plate; and
    a spacer for maintaining a specific gap between the upper plate and the lower plate.

7. The touch panel device according to claim 6, wherein the upper plate includes:
    an upper substrate;
    a black matrix formed on the upper substrate;
    a color filter formed on the upper substrate where the black matrix is formed;
    a common electrode formed on the color filter; and
    a first alignment film formed covering the common electrode.

8. The touch panel device according to claim 6, wherein the polarizer is formed between the upper plate of the liquid crystal display panel and the lower plate of the touch panel.

9. The touch panel device according to claim 6, comprising:
    a first adhesive formed between the polarizer and the lower plate of the touch panel; and
    a second adhesive formed between the polarizer and the upper plate of the liquid crystal display panel.

10. The touch panel device according to claim 6, wherein the lower plate of the liquid crystal display panel includes:
    a lower substrate;
    a gate line formed on the lower substrate;
    a data line formed crossing the gate line;
    a thin film transistor formed at an intersection of the gate line and the data line;
    a pixel electrode connected to the thin film transistor; and
    a second alignment film formed covering the pixel electrode.

11. A method of fabricating a touch panel integrated liquid crystal display panel, comprising the steps of:
    forming a liquid crystal display panel;
    forming a polarizer at a top surface of the liquid crystal display panel; and
    forming a touch panel on the polarizer, the touch panel including a lower plate having a separation tag extending outwardly from one side of the lower plate, such that when an upward force is applied on the separation tag, the touch panel separates from at least one side of the polarizer.

12. The method according to claim 11, further comprising the steps of:
    forming a first electrode layer on an upper substrate of an upper plate of the touch panel;
    forming a second electrode layer on the lower plate of the touch panel; and
    forming a spacer between the upper plate and the lower plate.

13. The method according to claim 12, wherein the separation tag is formed of a same material as the lower substrate.

14. The method according to claim 13, wherein the separation tag includes polyethylene terephthalate.

15. The method according to claim 12, wherein the first and the second electrode layers are formed of a transparent electrode and silver Ag is formed on the transparent electrode.

16. The method according to claim 11, wherein the liquid crystal display panel includes:
    an upper plate bonded with the polarizer;
    a lower plate facing the upper plate; and a spacer for maintaining a specific gap between the upper plate and the lower plate.

17. The method according to claim 16, wherein the upper plate of the liquid crystal display panel includes:
an upper substrate;
a black matrix formed on the upper substrate;
a color filter formed on the upper substrate where the black matrix is formed;
a common electrode formed on the color filter; and
a first alignment film formed covering the common electrode.

18. The method according to claim 17, wherein the lower plate of the liquid crystal display panel includes:
a lower substrate;
a gate line formed on the lower substrate;
a data line formed crossing the gate line;
a thin film transistor formed at an intersection of the gate line and the data line;
a pixel electrode connected to the thin film transistor; and
a second alignment film formed covering the pixel electrode.

19. The method according to claim 16, wherein the polarizer is formed between the upper plate of the liquid crystal display panel and the lower plate of the touch panel.

20. The method according to claim 16, comprising:
forming a first adhesive between the polarizer and the lower plate of the touch panel; and
forming a second adhesive between the polarizer and the upper plate of the liquid crystal display panel.

* * * * *